United States Patent

Faber et al.

[15] 3,697,187
[45] Oct. 10, 1972

[54] BORING BAR INSERT

[72] Inventors: Kurt H. A. E. Faber; Lars E. Norgren, Sandviken, both of Sweden

[73] Assignee: Sandvikens Jernverks AB, Sandviken, Sweden

[22] Filed: Feb. 19, 1971

[21] Appl. No.: 116,762

[52] U.S. Cl. ............... 408/154, 408/238, 408/239, 151/21 R, 151/21 C
[51] Int. Cl. ............................................. B23b 29/02
[58] Field of Search......408/153, 154, 155, 156, 146, 408/238, 239; 151/21 R, 21 C

[56] References Cited

UNITED STATES PATENTS 3,178,969  4/1965  Yogus et al.............408/154
3,349,648  10/1967  Holloway.................408/154
3,434,376  3/1969  Benjamin et al...........408/153

FOREIGN PATENTS OR APPLICATIONS 1,800,795  12/1969  Germany..................408/158

Primary Examiner—Andrew R. Juhasz
Assistant Examiner—Z. R. Bilinsky
Attorney—Mason, Kolehmainen, Rathburn & Wyss

[57] ABSTRACT

A boring bar insert for holding a cutting tool in an adjusted position in a boring bar. A non-rotatable threaded shank of the tool is engaged by an interiorly threaded, rotatable but axially immovable adjustment sleeve so that rotation of the adjustment sleeve causes axial movement of the shank. Resilient means are provided for eliminating axial and radial play between the shank and the adjustment sleeve.

8 Claims, 6 Drawing Figures

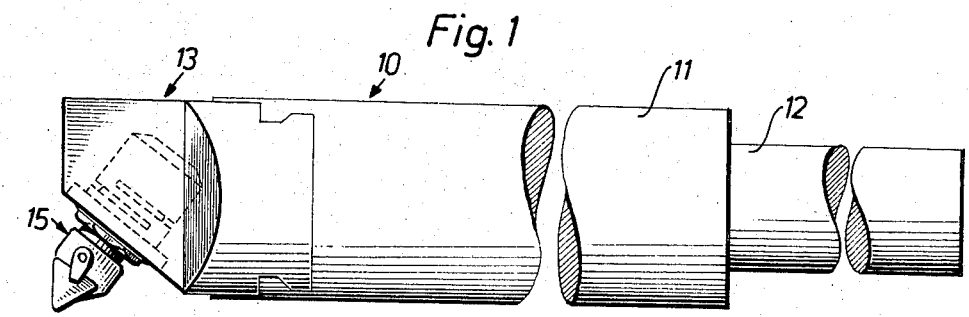
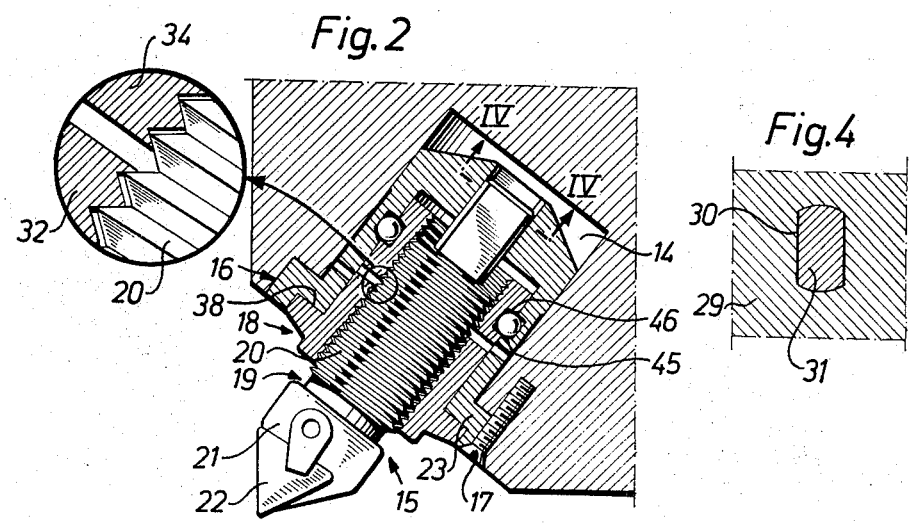
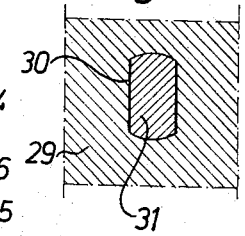

BORING BAR INSERT

This invention relates to tool holders of the kind adapted to be mounted in boring bars and used for holding a cutting tool in an adjusted position. Such tool holders are commonly termed "boring bar inserts" and sometimes "fine boring units." For convenience, the term "boring bar insert" will be used throughout this specification.

Several types of boring bar inserts are known in which a threaded shank of the cutting tool is engaged by an interiorly threaded adjustment nut or sleeve disposed in a bushing which is adapted to be inserted into and firmly secured in a recess in the boring bar. The shank is held against rotation, but permitted to move axially, relative to the bushing while the adjustment sleeve is held against axial movement, but permitted to rotate, relative to the bushing, and rotation of the adjustment sleeve will accordingly cause axial movement of the shank. In one particular type of boring bar inserts, spring means resiliently load the shank relative to the adjustment sleeve in an axial direction to eliminate any axial play between the mating threads of the shank and the sleeve and to frictionally lock the sleeve against rotation. Examples of this particular type of boring bar inserts are described in U.S. Pats. Nos. 3,178,969, 3,349,648, 3,400,616, and 3,434,376.

The principal object of this invention is to provide a boring bar insert of the particular type indicated in which the spring means are capable of applying a heavy axial load between the shank of the cutting tool and the adjustment sleeve, thereby minimizing the tendency of the cutting tool to move axially and radially relative to the adjustment sleeve under the influence of the cutting forces. A more specific object in accordance with the foregoing principal object is to provide a boring bar insert in which the spring means require little space and yet are capable of applying a heavy axial load between the shank and the sleeve.

Another object is to provide a boring bar insert of the particular type indicated in which rolling-contact bearing means are provided to retain a resilient portion of the bushing in an axially tensioned state and transfer the axial tension from the bushing to the adjustment sleeve, and to reduce the rotational friction between the adjustment sleeve and the bushing.

Still another object is to provide a compact boring bar insert of the particular type indicated which comprises a minimum of separate parts and which is relatively simple in manufacture and assembly and yet is capable of maintaining the cutting tool in an adjusted position even when the tool is acted on by heavy and fluctuating cutting forces.

These and other objects, the features of the invention and the attendant advantages will become apparent from the following detailed description of a preferred embodiment illustrated in the accompanying drawing, in which FIG. 1 is an elevational view of a boring bar in which a boring bar insert constructed in accordance with the invention is mounted;

FIG. 2 is an enlarged fragmentary sectional view of the boring bar of FIG. 1 showing the boring bar insert in longitudinal section;

FIG. 3 is a perspective view of the boring bar insert in FIGS. 1 and 2, portions of some elements being cut away;

FIG. 4 is a fragmentary cross-sectional view on line IV—IV of FIG. 2;

FIG. 5 is an elevational view of the bushing of the boring bar insert;

FIG. 6 is an elevational view of the adjustment sleeve of the boring bar insert.

FIG. 1 of the drawing shows a boring bar 10 having a shank 11 with a reduced portion 12 at one end adapted to be secured to a spindle in a boring mill or other metal-working machine. At the other end the boring bar 10 is provided with a laterally adjustable head 13 having a blind hole 14 (FIG. 2) in which a boring bar insert 15 constructed in accordance with the invention is received and firmly secured.

As best seen in FIGS. 2 and 3, the boring bar insert 15 comprises three main elements, namely, a substantially cylindrical bushing 16 which is snugly received in the blind hole 14 and firmly held in position therein by three angularly spaced screws 17 (only one is shown in the drawing), an interiorly threaded adjustment sleeve 18 which is mounted for rotation in the cylindrical bore of the bushing 16, and a cutting tool 19 (cutting cartridge) consisting of a threaded shank 20, which is threaded into the adjustment sleeve 18, and a cutting head 21, which is integral with the shank 20 and has a tungsten carbide tool bit 22 clamped or brazed thereto. As will be described in more detail below, these main elements, which are all made of steel of a suitable grade, are arranged in such a manner that rotation of the adjustment sleeve 18 will cause movement of the cutting tool 19 inwardly or outwardly relative to the boring bar 10. As will likewise be described in more detail below, the bushing 16 applies a resilient axial load between the adjustment sleeve 18 and the shank 20 so that any play between the mating threads of the sleeve and the shank is eliminated.

As seen in FIG. 2, the outer end of the bushing 16 is provided with an annular rim 23 which is seated in a counterbore at the outer end of the blind hole 14. The three screws 17 maintain the rim 23 in firm seating engagement with an annular shoulder defined by the bottom of the counterbore, and to this end they pass through opposed semi-circular recesses in the periphery of the rim 23 and the annular wall of the counterbore into tapped holes in the head 13 of the boring bar 10.

The bushing 16 comprises two axially aligned portions, an outer portion 24 and an inner portion 25, which are axially movable relative to each other within limits set by the resiliency of an intermediate bushing portion 26 integral with the outer and inner bushing portions. The intermediate portion 26 is provided with two transverse, axially spaced slots 27 which extend over more than one half of the circumference and are circumferentially offset 180 degrees from each other so that they overlap at both ends. The two arcuate bars between the overlapping end portions of the slots 27 form leaf-type springs, the ends of which are rigidly connected with the adjacent ends of the outer and inner bushing portions 24 and 25. The spring bars, although they permit relative axial movement of the bushing portions 24 and 25, form a torsionally rigid connection between these bushing portions to hold them against relative rotation.

Adjacent the rim 23 the outer bushing portion 24 has a close fit to the wall of the blind hole 14, and the inner end of the inner bushing portion 25 has a close sliding fit to the wall of the blind hole. For a purpose yet to be explained, the interior cylindrical surface of the inner bushing portion 25 is provided with an annular groove 28. At the rear end the inner bushing portion 25 has an end wall 29 with a non-circular, axially extending through hole 30, which is coaxial with the shank 20 of the cutting tool 19. An inwardly directed integral extension 31 of the shank 20 has a corresponding non-circular cross-section and has a close sliding fit to the hole 30 to permit axial displacement of the tool 19, but hold it against rotation, relative to the bushing 16.

The adjustment sleeve 18 is generally similar to the bushing 16 in that it is made in one piece and comprises two axially aligned portions, namely, an outer portion 32 and an inner portion 33, which are axially movable relative to each other, and a resilient intermediate portion 34 interconnecting the outer and inner portions. The intermediate portion 34 has two transverse, axially spaced slots 35 which extend over more than one half of the circumference and which are circumferentially offset 180° from each other so that they overlap at both ends and define leaf-type springs between the overlapping portions. These leaf-type springs permit relative axial movement of the outer and inner adjustment sleeve portions 32 and 33 but interconnect them for rotation as a unit.

As already mentioned, the adjustment sleeve 18 is interiorly threaded, and preferably the thread is provided also in the intermediate resilient portion 34 as shown in the drawing.

At the outer end the outer adjustment sleeve portion 32 has a radial circular flange 36 the inner face 37 of which slideably engages an annular seat 38 defined by the bottom of the counterbore at the outer end of the bore of the outer bushing portion 24. The flange face 37 and the seat 38 establish a fixed axial position of the adjustment sleeve 18 within the bushing 16. Adjacent the flange 36 and at the inner end of the inner sleeve portion 33, respectively, the two sleeve portions 32 and 33 have a close sliding fit to the interior cylindrical surface of the bushing 16 so that there is no appreciable radial play between the bushing 16 and the adjustment sleeve 18.

Adjacent the outer face of the radial flange 36, the outer adjustment sleeve portion 32 is formed with a hexagonal nut element 39 to which an adjustment wrench may be applied for rotating the adjustment sleeve 18 and thus adjusting the axial position of the cutting tool 19. Accurate setting of the adjustment sleeve is facilitated by graduations 40 and 41 on the outer faces of the rim 23 and the flange 36.

The exterior cylindrical surface of the inner adjustment sleeve portion 33 is formed with an annular groove 42 opposite to the interior annular groove 28 of the inner bushing portion 25. The grooves 28 and 42 together define an annular passage which houses a plurality of balls 43. These balls interconnect the inner bushing and adjustment sleeve portions 25 and 33 for axial movement together so that axial forces can be transferred between these portions, and they also form an antifriction bearing which reduces the rotational friction between the portions 25 and 32 so that the rotation of the adjustment sleeve 18 is facilitated. The balls are inserted into and removed from the groove through a radial bore 44 in the wall of the bushing 16.

As mentioned above, the bushing 16 resiliently loads the adjustment sleeve 18 in an axial direction. The axial load is brought about by the resilient intermediate bushing portion 26, which is maintained in a compressed state, and is applied to the inner adjustment sleeve portion 33 through the balls 43. Since the outer adjustment sleeve portion 32 is retained in a fixed axial position by the flange 36 engaging the annular seat 38, the axial load urges the sleeve portions 32 and 33 axially apart so that the axial play between threads of the adjustment sleeve and the shank 20 of the cutting tool 19 is eliminated as shown in the enlarged circular portion of FIG. 2. The resilient loading not only eliminates the axial play between the threads of the adjustment sleeve and the shank but is also effective to frictionally lock the adjustment sleeve against unwanted rotational movement so that a separate locking device can be dispensed with.

The machining accuracy that can be attained with boring bar inserts of the above-described type, where spring means are operative between the shank of the cutting tool and the adjustment sleeve for eliminating play and locking the sleeve, is dependent on the ability of the spring means to prevent the shank from moving radially within the sleeve under the influence of the cutting forces and, hence, proportional to the magnitude of the axial load. In known boring bar inserts of this type it has been difficult to make the spring means exert a sufficient axial force without unduly increasing the dimensions of the insert. In the boring bar insert 10 shown in the drawing, on the other hand, this problem is virtually eliminated, firstly because the spring means are disposed in the wall of the bushing so that they can be given a large diameter, secondly because the illustrated construction of the bushing 16 with the spring means in the form of transverse bars integral with the inner and outer bushing portions is in itself capable of producing very large axial forces without requiring a large axial or radial space. As a non-limiting example of the attainable axial force, it may be mentioned that in one size of an actual embodiment of the boring bar insert 10 the bushing 16 exerts a force of about 700 newtons (about 160 lb). In this size of the insert, the intermediate portion 26 of the bushing has an outer diameter of 22.0 millimeters (0.87 inches) and an inner diameter of 17.2 millimeters (0.68 inches), and the arcuate spring bars between the two slots 27 have a width of 2.8 millimeters (0.11 inches). Each of the two slots extends over about 275 degrees of the circumference and are circumferentially offset 180° from each other, so that the two spring bars are diametrically opposite and each extend over about one fourth of the circumference. In the assembled boring bar insert, the intermediate bushing portion 26 is compressed about 0.4 millimeters (0.16 inches).

When the boring bar insert 10 is assembled, the shank 20 of the cutting tool 19 is first threaded into the adjustment sleeve 18 which is then pushed into the bore of the bushing 16 until the inner face 37 of the flange 36 engages the seat 38. Thereupon the bushing 16 is compressed (about 0.5 millimeters in the example given above) by means of a suitable press so that the annular grooves 28 and 42 in the bushing and the adjustment sleeve are brought in accurate register with each other, and the balls 43, which are hardened steel balls, are inserted into the annular passage defined by the grooves through the bore 44 in the wall of the bushing. When the bushing is relieved from the compression force, it urges the adjustment sleeve portions 32 and 33 axially apart as described above.

The axial load between the shank 20 and the adjustment sleeve may be amplified by the adjustment sleeve itself if the inner and outer sleeve portions are held in a slightly compressed state during the formation of the thread in the sleeve. As already mentioned, the thread is preferably formed also in the intermediate portion 34. This increases the range of adjustment of the shank 20, since the axial loading between the shank and the adjustment sleeve will be maintained until the inner end of the thread of the shank is disengaged from the spring bars between the slots 27, that is, until the inner end of the thread of the shank has been displaced outwardly to the outer slot. If the thread is formed only in the outer and inner sleeve portions 32 and 33, the axial loading is removed as soon as the inner end of the thread of the shank is disengaged from the inner sleeve portion 33.

With reference to FIG. 2, the inner wall 45 of the annular groove 28 of the bushing 16 and the outer wall 46 of the annular groove 46 of the adjustment sleeve 18, that is, those walls of the groove which engage the balls 43 under the influence of the axial load, are both frusto-conical and converge outwardly so that they tend to force the balls radially inwardly, thereby preventing the balls from escaping from the grooves through the hole 44. Suitable angles of inclination (as measured from a plane at right angles to the common longitudinal axis of the bushing 16, the adjustment sleeve 18 and the shank 20) are 25° and 10° for the inner wall 45 respectively the outer wall 46.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A boring bar insert comprising
   a. a cutting tool having an exteriorly threaded shank and a cutting head on one end of the shank;
   b. an adjustment sleeve comprising axially aligned, interiorly threaded outer and inner portions which are in threaded engagement with the shank of the cutting tool and which are interconnected for rotation as a unit relative to the shank but are axially movable relative to each other to eliminate axial play between the mating threads of the shank and the sleeve portions;
   c. a bushing coaxially surrounding the adjustment sleeve and comprising axially aligned outer and inner portions and means holding the bushing portions against relative rotation while permitting relative axial movement, the outer bushing portion having means for firmly securing it to a boring bar;
   d. cooperating seating means on the outer bushing portion and the outer adjustment sleeve portion supporting the outer sleeve portion for rotation in a fixed position within the outer bushing portion;
   e. guide means for preventing relative rotation of the bushing and the tool so that rotation of the adjustment sleeve causes axial movement of the tool relative to the adjustment sleeve and the bushing;
   f. spring means acting between the bushing portions to resiliently load the inner bushing portion axially relative to the outer bushing portion; and
   g. anti-friction coupling means positively interconnecting the inner bushing portion and the inner adjustment sleeve portion for axial movement together so as to transfer the resilient axial load from the inner bushing portion to the inner adjustment sleeve portion, and simultaneously permitting relative rotation of the inner bushing and sleeve portions at low friction.

2. A boring bar insert as set forth in claim 1 in which the bushing is integral and the spring means comprise an intermediate bushing portion between said inner and outer bushing portions, the intermediate bushing portion having at least two transverse, axially spaced slots therethrough which are circumferentially offset from each other so as to overlap at their ends.

3. A boring bar insert as set forth in claim 1 in which the coupling means comprise rolling-contact bearing bodies disposed in opposed annular grooves in the exterior surface of the inner adjustment sleeve portion and the interior surface of the inner bushing portion, respectively.

4. A boring bar insert as set forth in claim 3 in which the rolling-contact bearing bodies are balls.

5. A boring bar insert as set forth in claim 2 in which the adjustment sleeve is integral and comprises a resilient intermediate sleeve portion between said inner and outer sleeve portions, the intermediate sleeve portion having at least two transverse axially spaced slots therethrough which are circumferentially offset from each other so as to overlap at their ends.

6. A boring bar insert as set forth in claim 5 in which the adjustment sleeve is interiorly threaded also on the intermediate sleeve portion.

7. A boring bar insert as set forth in claim 1 in which the end of the bushing remotest from the cutting head of the tool comprises an inwardly extending portion having an axially extending noncircular opening therein and in which the adjacent end of the shank is provided with a noncircular axial extension fitting slideably in said opening.

8. A boring bar insert comprising
   a. a cutting tool having an exteriorly threaded shank and a cutting head on one end of the shank;
   b. an adjustment sleeve comprising axially aligned, interiorly threaded outer and inner portions which are in threaded engagement with the shank of the cutting tool and which are interconnected for rotation as a unit relative to the shank but are axially movable relative to each other to eliminate play between the mating threads of the shank and the sleeve portions;
   c. an integral bushing coaxially surrounding the adjustment sleeve and comprising axially aligned outer, intermediate, and inner portions, the outer bushing portion having means for firmly securing it to a boring bar, and the intermediate bushing portion having at least two transverse, axially spaced slots therethrough which are circumferentially offset from each other so as to overlap at their ends and define between the overlapping portions circumferentially extending, axially yieldable leaf-type springs, d. annular bearing means on the outer bushing portion and on the outer adjustment sleeve portion cooperating to support the outer adjustment sleeve portion for rotation in a fixed position within the outer bushing portion;

e. guide means for preventing relative rotation of the bushing and the tool so that rotation of the adjustment sleeve causes axial movement of the tool relative to the adjustment sleeve and the bushing; and f. means for maintaining the intermediate bushing portion in an axially compressed state, these means including rolling-contact bearing bodies disposed in a pair of opposed annular grooves in the exterior surface of the inner adjustment sleeve portion and the interior surface of the inner bushing portion, respectively, and positively interconnecting the inner sleeve and bushing portions for axial movement inwardly as a unit, so that the adjustment sleeve portions are urged axially apart.

* * * * *